July 28, 1953 L. M. KUBAUGH 2,647,023
TRACK FOR TRACK-LAYING VEHICLES
Filed Oct. 19, 1948 2 Sheets-Sheet 1
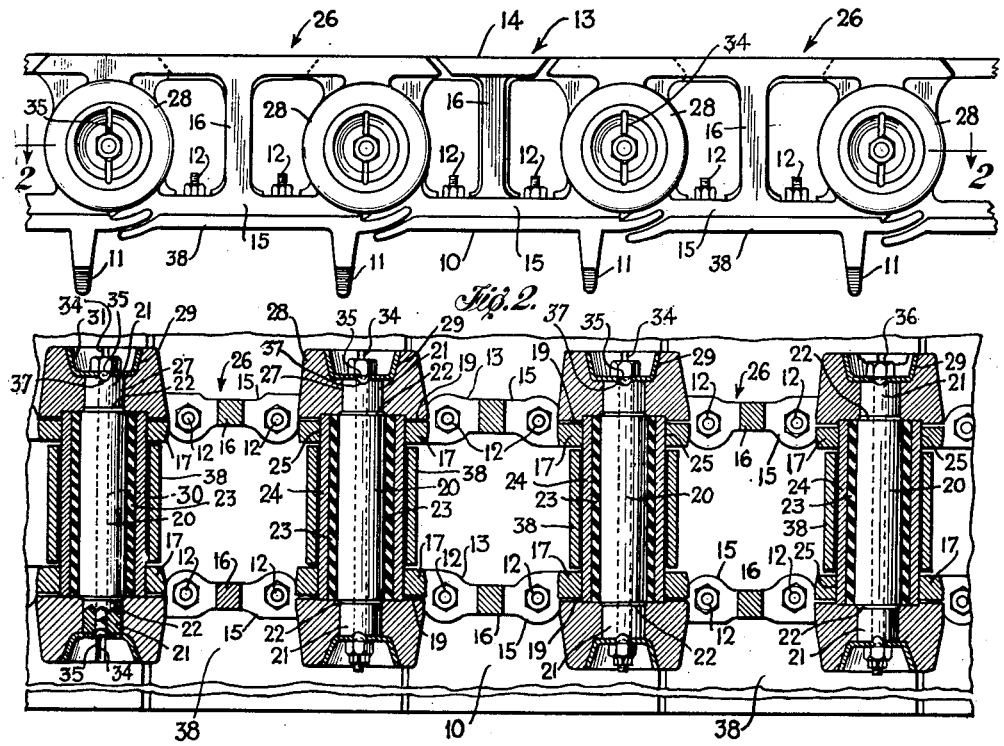
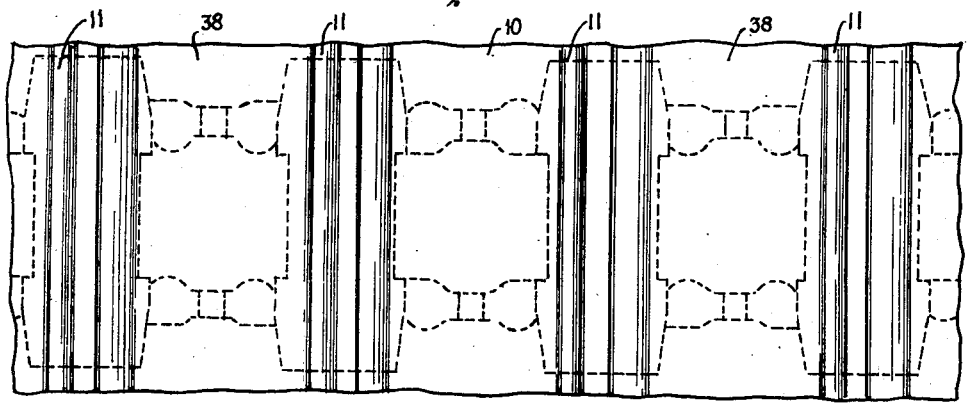
Inventor
LEROY M. KUBAUGH
By
Ely & Frye
Attorneys July 28, 1953  L. M. KUBAUGH  2,647,023
TRACK FOR TRACK-LAYING VEHICLES
Filed Oct. 19, 1948  2 Sheets-Sheet 2
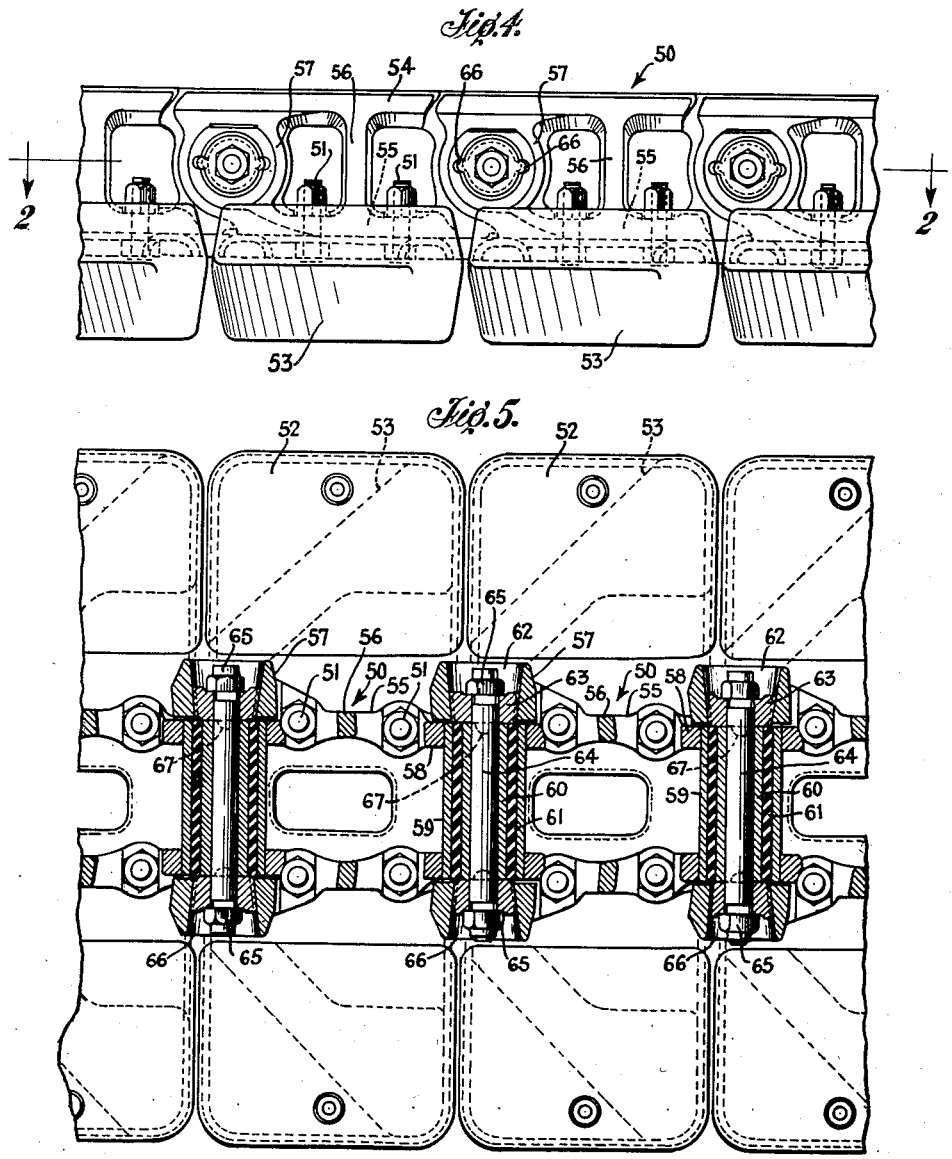
Inventor
LEROY M. KUBAUGH
Attorneys Patented July 28, 1953

2,647,023

UNITED STATES PATENT OFFICE 2,647,023

TRACK FOR TRACK-LAYING VEHICLES

LeRoy M. Kubaugh, Akron, Ohio, assignor to The Firestone Tire & Rubber Company, Akron, Ohio, a corporation of Ohio Application October 19, 1948, Serial No. 55,351

12 Claims. (Cl. 305—10)

This invention relates to endless tracks for track-laying vehicles, and in particular to track shoes employing torsional rubber bushings.

It is an object of the invention to provide a track wherein shoes may be readily replaced in the trouble area of the track without chainwise disassembly and assembly from a key pin. It is a further object to facilitate the removal of individual shoes without operating on force-fit or other such difficult connections.

The above enumerated objects are attained by the present invention in one case by provision of two sets of links, inner and outer, the former in parallel pairs, having a permanent connection as by a force fit with the outer shells of a pair of rubber-bushed pins and comprising a unit of assembly, and the latter, in parallel pairs, engaging the inner cores of the end bushings of two such assembly units of the inner links, and being locked in place by simple bolt and nut action.

In a modified form identical links are employed throughout on each side of the track, and are removable transversely of the pin.

For a more complete understanding of the invention reference is made to the accompanying detailed specification of preferred embodiments illustrated in the drawings, in which:

Fig. 1 is a side elevation of a portion of an assembled track with ground-engaging cleats downward;

Fig. 2 is a section on the line 2—2 of Fig. 1;

Fig. 3 is a bottom plan view of Fig. 1; and

Figs. 4 and 5 are used similar to Figs. 1 and 2 showing a modified form of track.

Referring to the drawings by characters of reference, there is shown at 10 the main body or web portion of a track shoe in multiple, each having a ground-engaging cleat 11. At the lateral edges of each of these are affixed, as by bolts or screws 12, a pair of inner links 13 which are identical, but reversed in position to present symmetry about the longitudinal extent of the track. Each of these inner links comprises integrally a top rail 14, a bottom rail 15, a central web 16 and end rings 17. The outer edges of both the upper and bottom rails are stepped inwardly at their ends as shown at 19 to accommodate the outer or connecting link in a lapped fit to obviate any staggering in the overall top-plan profile of the chain of links.

A complete sub-assembly of the inner link unit will contain a pair of the rubber-bushed pivot elements. The latter each comprise a tubular core 20 with reduced ends 21 and beveled shoulders 22. Surrounding the core 20 is a rubber sleeve 23 held under radial compression by an outer sleeve 24. Assembly is effected by inserting the ends of these outer sleeves into the openings 25 in the end rings 17 of the inner links, as by a force-fit, so that the outer sleeves are in effect integral with the links.

Cylindrical shells 38 are received on sleeves 24 in a close rolling fit and serve to communicate a sprocket drive to the track and to bear and roll in idler wheels.

Having a sufficient number of these inner link sub-assemblies, the endless track may be assembled by joining these sub-assemblies through the medium of the outer links 26. These are markedly similar to the inner links 13 except that the openings 27 in their end rings 28 are of smaller bore than the openings 25 in the end rings 17 of the inner links 13, and the end rings 28 protrude outwardly of their links and have a frusto-conical cavity 29. Each opening 27 is slidably received on one of the reduced portions 21 of the pivot pin core 20 and they are secured in place in opposed pairs by means of a bolt 30, frusto-conical washers 31 and nuts 32. The washers 31 have an outwardly extending, generally diametral rib having one portion 34 in the slant side of the cone, and a portion 35 on the top thereof. These are received, respectively, in complementary grooves, 36 in the conical recess 29, and 37 across the end face of the reduced portion 21 of the pivot core.

Thus, when the nut 32 is tightened up on the bolt 30 the conical washers 31 on each side of the track are drawn up into conical cavity 29 with the ribs 34, 35 mating with the grooves 36, 37. The effect is not only to integrate a pair of the sub-assemblies carried by the inner links but also to key the pivot core 20 against rotation with respect to the outer, connecting link 26. Thus, since the inner link is rigid with the outer shell 24, the pivot action between consecutive pairs of links as the track moves in a curved path takes place through torsion in the rubber cushion 23.

While the two species of links have been referred to as "inner" and "outer," it will be understood that this refers to the end ring portions which receive the pivot unit, the main bodies of the links being disposed substantially in a straight line longitudinally of the track.

The main track bodies are assembled to their respective pairs of links after the end ring portions of the links have been engaged with the pivot unit. Thus, portions 10 are bolted to links 13 after the ends of shells 24 have been force-fitted into openings 25; and body portions 38 are bolted to links 26 after the latter have been secured on reduced ends 21 of the pivot core 20. Conversely, on disassembly, the body portions are removed first.

Since core 20 and shell 24 rotate relative to each other, the provision of the shoulder 22 on the core ensures that there will be no binding in the parts.

The bolting arrangement described affords many benefits. The ribbed washer effectively obviates any transmission to the nut or bolt head of loads incident to the oscillation of the links. Thus, the role of the bolt and nut is confined to impressing the ribs of the washers into the grooves and holding them there. A relatively light bolt is sufficient for this purpose. It follows, also, that a bolt free from heavy load demands will be a factor in providing ease of assembly and disassembly, as contrasted, for instance, with the usual integrating means involving a force-fit on a track shoe pin.

Aside from its keying function, the dished washer provides a considerable area of support for holding the outer links in position, and furnishes a rigidity over and above that incident to a plain washer and thus minimizes any tendency of the links to work loose through lateral skewing.

In addition to the individual attachment features, the track of this invention provides a much-needed adaptability for servicing in the field. If an outer link becomes unserviceable it can be replaced with no more effort than required in removing and restoring a body portion, and pair of nuts or a pair of bolts. If any other element requires replacing it will be a part of the sub-assembly of pivots carried by a pair of inner links. For replacement of the sub-assembly, two pairs of outer links, one on each side thereof, will be removed. Then the entire sub-assembly can be replaced or a part thereof repaired or replaced, whichever is most expedient, bearing in mind that the removal of force-fit parts is not very desirable procedure in the field. In all cases, however, the remedy can be applied without the excessively burdensome task of removing a track chainwise and piecemeal from a key link to the trouble point.

In the foregoing described track wherein two types of link occur alternately in pairs it is a necessary consequence that an entire assembled track be composed of an even number of shoes. Shoes which can be assembled into tracks of either an even or odd number, as desired, present certain advantages but heretofore these have been outweighed by the fact that disassembly has always demanded stepwise dismantling starting from a kingpin.

In the modification shown in Figures 4 and 5 is shown a track assembly of this type which permits removal or insertion of a shoe by operation at a single location. In shoes of this general type, the links on one side of the track are identical and the end rings of each are staggered respecting one another each pair of links engaging one end of pin with an outer and an inner ring. The links are removed one by one in a direction axially of the pins after a pair of outer rings have been separated from the kingpin. In the improved form of Figs. 4 and 5 each pin is in effect a kingpin as in Figs. 1 to 3 and in addition, each outer ring is removable from its pin by motion transverse to the axis thereof.

Referring to the figures, identical links, each indicated as a whole by the numeral 50 are attached in pairs by bolts 51 to shoes 52 carrying cleats 53. The links on one side of the track are mirror images of those on the other side, and will therefore be numbered and described on one side only. These comprise a top rail 54, a bottom rail 55, a central web 56, and end rings, an outer one 57 and an inner one 58. The inner ring 58 has a tight-fitting engagement with the outer sleeve 59 of a pin member having an inner sleeve 60 and an intermediate rubber sleeve 61. These sleeves will preferably be of equal length but in any event the longest of them will have a length shorter than the distance between a pair of outer rings 57. The latter have a frustoconical bore 62 which receives a washer 63 of complementary shape and of considerable depth, pairs of such washers being secured in place by means of a bolt 64 fitted through inner sleeve 60 and held by nuts 65. A pair of ribs 66 along the slant face of the washer mate with complementary grooves in the face 62 of the outer ring 57 and key the washer for rotation with the ring. Likewise a pair of ribs 67 on the bottom of the washer are received in complementary slots in the edge of the inner sleeve 60 and serve not only to transmit rotation of ring 57 to sleeve 60 but also to shift a good deal of the driving thrust in the links to the said sleeve thus relieving the load on the bolt 64.

In addition to the advantage already enumerated in connection with the modification of Figs. 1 to 3, it will be seen that the track may be opened at any location by the simple expedient of removing a bolt 64. The outer ring 57, being clear of the ends of the pin assembly 59, 60, 61, may be swung or slid transversely of the axis thereof. With the removal of any two of the bolts the entire section therebetween, consisting of one or more shoes may be lifted out.

It will be seen that the pivot unit in the two modifications is quite similar, the essential differences in the two cases being that in the Fig. 5 modification the ends of pin 60 lie within the inside faces of link ends 57. Thus, any single pair of links may be lifted out after their two bolts have been removed. In the Fig. 1 modification, the pair of links are removed in a movement axially of the pin, and it is not therefore necessary to shorten the tubular pin.

The foregoing description of preferred embodiments of my invention is by way of illustration and the invention should not be considered as limited except as shall appear from the scope of the appended claims.

What is claimed is:

1. A hinge unit for endless tracks for tracklaying vehicles comprising a sleeve, a pair of links each having one end surrounding said sleeve at opposite ends thereof and affixed thereto against relative rotation, a tubular pin within said sleeve, a rubber bushing in radially compressed condition between said pin and said sleeve, a pair of links each having an end located outside said sleeve and each having an opening axially aligned with said sleeve, a bolt received in said pin, washers secured by said bolt, each said washer having keying means engaging an outside link and engaging said pin.

2. In a track for tracklaying vehicles, a pin member having an outer, concentric sleeve rotatable relative to the pin member, a first link attached to the sleeve, a second link, a removable fastening member axially applicable to the pin member and securing the second link thereto, and keying means between the fastening means and the link and between the fastening means and the pin member, said pin member and sleeve being substantially coextensive in length whereby the said second link may be displaced by motion in a direction solely transverse to the pin axis in the absence of the fastening means.

3. In a track for tracklaying vehicles, a tubular pin member having an outer concentric sleeve rotatable relative to the pin member, a first link attached to the sleeve, a second link, a bolt passing through the pin member, fastening means between the bolt securing the said second link in place and comprising locking means engaging with the said second link and the said pin member, respectively, said pin member and sleeve being substantially coextensive in length whereby the said second link may be displaced by motion in a direction solely transverse to the pin axis in the absence of the fastening means.

4. For use in the track of a track-laying vehicle, as an article of manufacture, a pivot unit comprising a central pin member having an opening to accommodate a fastening means for a track link, an outer sleeve concentric with the pin member rotatable with respect thereto and of a length substantially coextensive with the pin member whereby a pair of track links may be brought into alignment with the pin member axis by motion solely transverse to axis, and said pin member having recesses in its end faces to accommodate keying means.

5. The pivot unit of claim 4 said pin member being tubular, and said recesses occurring in the edges thereof.

6. In a track for tracklaying vehicles, in combination, a pair of pivot units each comprising a tubular pin member, an outer sleeve concentric thereto, rotatable with respect thereto and of a length substantially coextensive therewith, a pair of links each having one end secured to the sleeve of the pin member of one said unit and the other end abutting one end of the other of said units, a bolt through the pin member of the said other of said units, washers held by the bolt and securing the said other ends of said links to the said other of said units, and keying means on the said washers extending into the pin member in interlocking relation therewith.

7. A track for tracklaying vehicles comprising a tubular pin member, an outer sleeve concentric with said pin member rotatable with respect thereto and of a length terminating short of each end of the pin member, a pair of links having openings received on the ends of said pin member beyond the ends of the said sleeve, said openings being flared outwardly, dished washers complementarily received in said openings, and means extending through said pin member and retaining said washers in said openings.

8. A track for tracklaying vehicles comprising a pin member, an outer sleeve concentric with the said pin member and rotatable with respect thereto, a link rigidly attached to the said sleeve, said pin member extending beyond the end of said sleeve, a second link received on an end of said pin member adjacent the said first link, and attaching means to fasten the said second link to the end of said pin member, constructed and arranged to lock the said second link against rotation relatively to the said pin member, said attaching means comprising a bolt disposed in said pin member and projecting from both ends thereof, at least one end ring and conical washer and a nut association with said bolt.

9. In a track for track-laying vehicles, a tubular pin member having an outer concentric sleeve rotatable relative to the pin member, a first link attached to the sleeve, a second link, a bolt passing through the pin member, fastening means securing the said second link in place comprising a bolt disposed in said pin member, said bolt projecting a distance axially beyond both ends thereof, a pair of end rings, a conical washer and a nut associated with said bolt, said pin member and sleeve being substantially coextensive in length whereby the said second link may be displaced by a motion in a direction solely transverse to the pin axis in the absence of the fastening means.

10. In a track for tracklaying vehicles, a plurality of replaceable units each comprising a pair of pivot members having each an inner pin member and an outer sleeve concentric with the said pin member and rotatable with respect thereto, a pair of links joining each said pair of pivot members and being rigidly attached to the said outer sleeves thereof, said pin members extending beyond the ends of said sleeves, and a second pair of links received on and joining the extended ends of pin members of adjacent units, said pin members being hollow, attaching means for the said second pair of links extending through said pin members and comprising dished washers having interlocking means engaging with the said second pair of links and with the pin members to prevent relative rotation therebetween.

11. In combination, a hollow pin member and a link member, frusto-conical recesses in the link member, a groove in each end of said pin member and a groove in each of said recesses, attaching means for said members comprising a rigid dished washer complementarily seated in each of said recesses and having ribs engaged in said grooves, said washers being held in bolted, non-rotatable relation to said pin and link members by a bolt disposed in and projecting axially beyond said pin.

12. The combination of claim 11, said grooves in said pin member being diametral of the end thereof, and said grooves in said recess being parallel with the conical elements.

LEROY M. KUBAUGH.

References Cited in the file of this patent

UNITED STATES PATENTS

| Number | Name | Date |
|---|---|---|
| 1,424,441 | Best | Aug. 1, 1922 |
| 1,494,568 | Allen | May 20, 1924 |
| 1,575,475 | White | Mar. 2, 1926 |
| 1,958,139 | Gammeter | May 8, 1934 |
| 2,175,423 | Young | Oct. 10, 1939 |
| 2,339,273 | Knox | Jan. 18, 1944 |
| 2,389,156 | Knox | Nov. 20, 1945 |
| 2,430,573 | Krotz | Nov. 11, 1947 |